United States Patent
Soininen et al.

(10) Patent No.: US 7,263,087 B2
(45) Date of Patent: Aug. 28, 2007

(54) METHOD AND SYSTEM FOR ADDING IP ROUTES TO A ROUTING MOBILE TERMINAL WITH 3G MESSAGES

(75) Inventors: Jonne Soininen, Mountain View, CA (US); Jari T. Malinen, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 1133 days.

(21) Appl. No.: 10/350,899

(22) Filed: Jan. 24, 2003

(65) Prior Publication Data

US 2003/0152042 A1 Aug. 14, 2003

Related U.S. Application Data

(60) Provisional application No. 60/351,654, filed on Jan. 25, 2002.

(51) Int. Cl.
 *H04Q 7/24* (2006.01)
(52) U.S. Cl. ............... 370/338; 370/401; 370/331; 455/445; 455/426.1; 455/432.1; 455/432.2
(58) Field of Classification Search ............ 370/338, 370/401, 328, 331, 351, 330, 395.31, 395.32; 455/445, 432.1–432.2
See application file for complete search history.

(56) References Cited

U.S. PATENT DOCUMENTS

| | | | | |
|---|---|---|---|---|
| 6,487,605 | B1 | 11/2002 | Leung | 709/245 |
| 6,563,919 | B1 | 5/2003 | Aravamudhan et al. | 379/230 |
| 6,584,098 | B1 | 6/2003 | Dutnall | 370/354 |
| 6,636,498 | B1 * | 10/2003 | Leung | 370/338 |
| 7,099,326 | B2 * | 8/2006 | Flinck et al. | 370/392 |
| 2002/0049059 | A1 * | 4/2002 | Soininen et al. | 455/439 |

OTHER PUBLICATIONS

F. Baker, "Requirements for IP Version 4 Routers", *RFC 1812*, pp. 1-178, Jun. 1995.
S. Deering et al., "Internet Protocol, Version 6 (IPv6) Specification", *RFC 2460*, pp. 1-42, Dec. 1998.
T. Narten et al., "Neighbor Discovery For IP Version 6 (IPv6)", *RFC 2461*, pp. 1-96, Dec. 1998.

(Continued)

*Primary Examiner*—Doris H. To
*Assistant Examiner*—Long Nguyen
(74) *Attorney, Agent, or Firm*—Squire, Sanders & Dempsey L.L.P.

(57) ABSTRACT

The invention is directed to enabling an serving node and a gateway node to be informed of a new route for a new node or sub-network that has become active behind a Mobile Terminal that can also act as a router. When IP level route injection occurs at the Mobile Terminal, a Modify session profile message causes insertion of a new IP address or prefix at a gateway node related to the new route. Also, the gateway node will update the serving node and the Mobile Terminal with information related to the new route or a proposed new route. The Mobile Terminal and the gateway node can share routing information over a dynamic routing protocol. Additionally, the Mobile Terminal and the gateway node can configure static routing information on routes towards each other. The new route can be added with 24.008 and/or GTP messages when initiated on the Mobile Terminal side for either the dynamic or static case.

34 Claims, 3 Drawing Sheets

OTHER PUBLICATIONS

S. Thomson et al., "IPv6 Stateless Address Autoconfiguration", *RFC 2462*, pp. 1-28, Dec. 1998.

A. Conta et al., "Internet Control Message Protocol (ICMPv6) For The Internet Protocol Version 6 (IPv6) Specification", *RFC 2463*, pp. 1-21, Dec. 1998.

M. Crawford, "Transmission of IPv6 Packets Over Ethernet Networks", *RFC 2464*, pp. 1-10, Dec. 1998.

D. Haskin et al., "Management Information Base For IP Version 6: Textual Conventions And General Group", *RFC 2465*, pp. 1-41, Dec. 1998.

D. Haskin et al., "Management Information Base For IP Version 6: ICMPv6 Group", *RFC 2466*, pp. 1-19, Dec. 1998.

M. Crawford, "Transmission of IPv6 Packets Over FDDI Networks", *RFC 2467*, pp. 1-7, Dec. 1998.

V. Cerf, "I Remember IANA", *RFC 2468*, pp. 1-4, Oct. 1998.

T. Narten et al., "A Caution On the Canonical Ordering Of Link-Layer Addresses", *RFC 2469*, pp. 1-4, Dec. 1998.

M. Crawford et al., "Transmission of IPv6 Packets Over Token Ring Networks", *RFC 2470*, pp. 1-9, Dec. 1998.

R. Hinden et al., "IPv6 Testing Address Allocation", *RFC 2471*, pp. 1-4, Dec. 1998.

D. Haskin et al., "IP Version 6 Over PPP", *RFC 2472*, pp. 1-11, Dec. 1998.

A. Conta et al., "Generic Packet Tunneling In IPv6 Specification", *RFC 2473*, pp. 1-28, Dec. 1998.

"Mobile Station (MS) Supporting Packet Switched Services", *3GPP TS 27.060 v4.0.0*, pp. 1-27, Mar. 2001.

"GPRS Tunnelling Protocol (GTP) Across the Gn and Gp Interface", *3GPP TS 29.060 v6.0.0*, pp. 1-95, Mar. 2003.

"Mobile Radio Interface Layer 3 Specification; Core Network Protocols; Stage 3", *3GPP TS 24.008 v6.0.0*, pp. 1-484, Mar. 2003.

\* cited by examiner

METHOD AND SYSTEM FOR ADDING IP ROUTES TO A ROUTING MOBILE TERMINAL WITH 3G MESSAGES

RELATED APPLICATION

This utility patent application is a continuation of a previously filed U.S. provisional patent application, U.S. Ser. No. 60/351,654 filed on Jan. 25, 2002, the benefit of the filing date of which is hereby claimed under 35 U.S.C. §119(e).

FIELD OF THE INVENTION

The present invention relates to IP mobility for mobile nodes, and more particularly to enabling IP routes to be added to a routing mobile node.

BACKGROUND OF THE INVENTION

This invention considers the problem of enabling a Mobile Terminal to function as an IP router on a Third Generation Partnership Project (3GPP) wireless network. Currently, a Mobile Terminal is standardized to connect to a 3GPP network as purely a terminal, which means on the Internet Protocol (IP) level the Mobile Terminal is assumed to support only IP/IPv6 host functionalities. This means that router functionalities, such as those defined in RFC 1812 for IPv4, or scattered into the RFCs 2460 to 2473 for IPv6, typically cannot be supported on or behind current 3GPP Mobile Terminals.

Mobile Terminal functionalities, as specified in 3GPP TS 27.060 V4.0.0 (2001-03) document, indicate that a Mobile Terminal is designed to function on a high level in a similar manner as a modem, which establishes a connection with a network access server (NAS). This design in the current specification enables IP host operation only rather than operation over a point-to-point link connected to an IP router. One issue is that the Gateway General Packet Radio Service (GPRS) Support Node (GGSN) assigns individual addresses for the Mobile Terminal in an activated Packet Data Protocol (PDP) Context, and does not forward traffic for other IP addresses via those addresses. Thus, a Mobile Terminal may not configure addresses into itself if there are other addresses in it or behind it, e.g. in a personal area network (PAN) connected to other networks via a Mobile Terminal. Also, there is a requirement for legal interception of traffic by the Mobile Terminal, in addition to the IPv6 routing requirements.

SUMMARY OF THE INVENTION

In accordance with the invention, a method is directed to adding a new route for a node disposed behind a mobile terminal that can operable as a router for the node disposed behind the Mobile Terminal. In response to receiving the new route for the node, the Mobile Terminal can send an Activate session profile message to a gateway node and send a Modify session profile message along with the new route to a serving node. The serving node records the new route and updates the gateway node with the new route. The gateway node can also determine each new route that is updateable to a routing table. Each updateable new route is added to the routing table and an Update session profile message along with the new route is sent to the serving node and the Mobile Terminal. Also, the gateway node can determine each new route that is un-updateable to the routing table. If the gateway node is unable to propose another new route that is updateable to the routing table for the node, the gateway node can send an error message to the serving node and the Mobile Terminal. Additionally, if the gateway node does propose the other new route that is updateable to the routing table for the node, the gateway node can send the other new route along with the Update session profile message to the serving node and the Mobile Terminal where they are employed to update the serving node and the Mobile Terminal with the other new route.

In accordance with another aspect of the invention, the node represents at least one sub-network.

In accordance with still another aspect of the invention, in response to receiving a request to delete a route for the node disposed behind the Mobile Terminal, the Mobile Terminal sends another activate session profile message to the gateway node and sends another Modify session profile message along with the deleted route to the serving node. The serving node records the deletion of the route and updates the gateway node with the deletion of the route. Additionally, the gateway node is employed to delete the route from the routing table and provide another Update session profile message to the serving node and the Mobile Terminal along with the deleted route.

In accordance with yet another aspect of the invention, the gateway node is a GGSN, the serving node is a SGSN and the session profile is a PDP context.

In accordance with still yet another aspect of the invention, an API from an IP routing engine of the Mobile Terminal is employed for GPRS signaling. Manipulation of at least one of a kernel route and an alias address through an IP routing socket is employed to cause the triggering of a corresponding Modify PDP context message.

In accordance with a further aspect of the invention, the Mobile Terminal and the gateway node share routing information over a dynamic routing protocol.

In accordance with yet a further aspect of the invention, the Mobile Terminal and the gateway node configure static routing information on at least one route towards each other.

In accordance with yet another aspect of the invention, an apparatus and system may be employed to practice substantially the same actions discussed above for the method.

DETAILED DESCRIPTION OF THE PREFERRED EMBODIMENT

Figure 1:
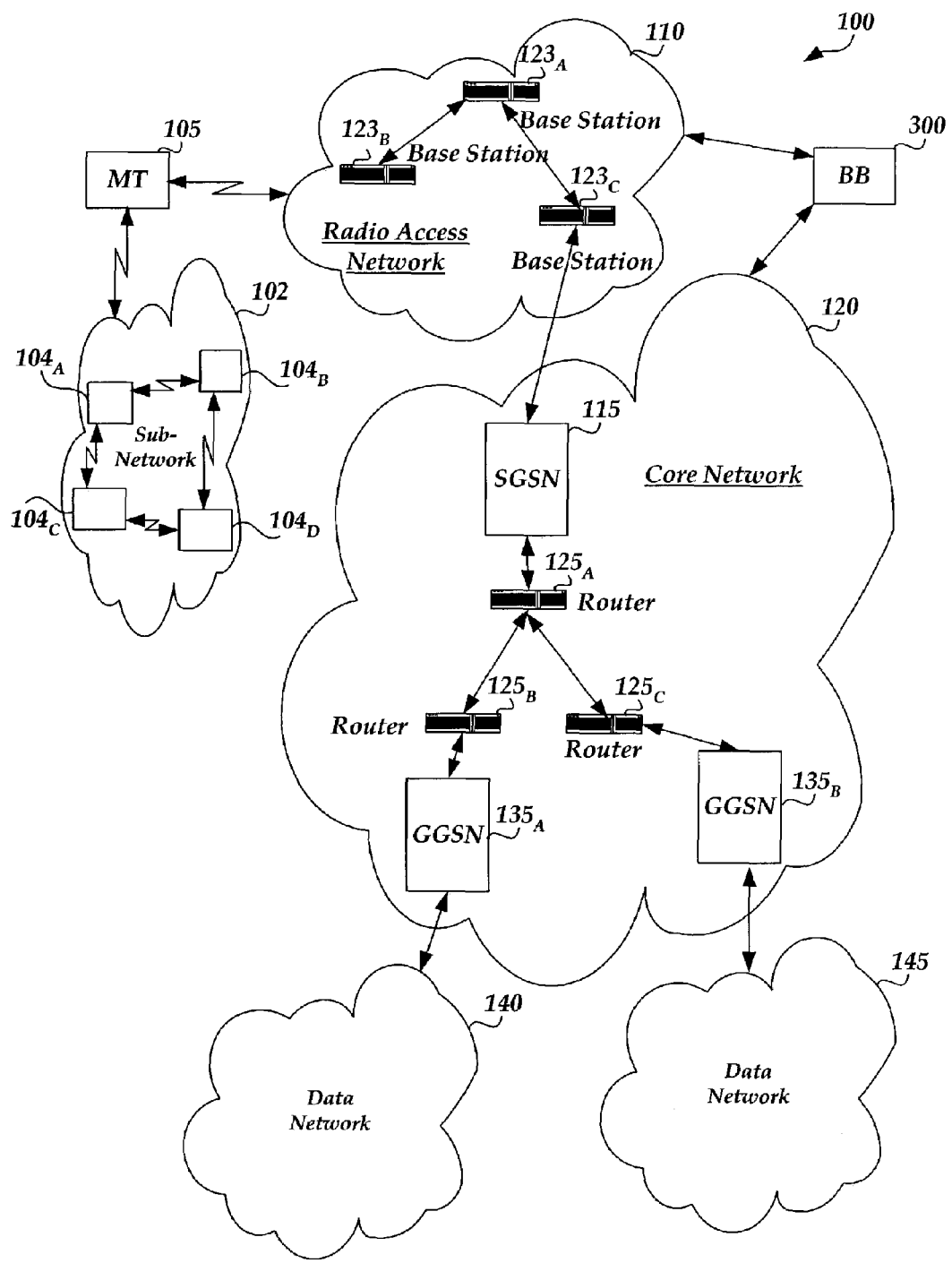
FIG. 1 illustrates an exemplary mobile IP network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element that monitors a load for a link within a path. The term "link load" refers to the load associated with the node. The term "flow" means a flow of IP packets. The term support node refers to both "GGSN" and "SGSN" nodes. The term "user" refers to any person or customer such as a business or organization that employs a mobile device to communicate or access resources over a mobile network. The term "operator" refers to any technician or organization that maintains or services an IP packet based network. The term "identifier" includes an MSISDN number, an IP address, or any other information that relates to the location or identity of the user.

The term "router" refers to a dedicated network element that receives IP packets and forwards them to their destination. In particular, a router is used to extend or segment networks by forwarding IP packets from one logical network to another. A router typically operates at layer 3 and below of the Open Systems Interconnection (OSI) reference model for networking. However, some routers can provide additional functionality that operates above layer 3 of the OSI reference model.

Generally, a router is aware of multiple paths that a received IP packet can take to its final destination. Based on the logical address included in a received IP packet, a router will forward the IP packet along an optimal path towards its final destination. Typically, a router contains internal tables of information called routing tables that keep track of all known network addresses and possible paths throughout the internetwork, along with the cost of reaching each logical network. A router optimally routes IP packets based on the available paths and their costs, thus taking advantage of redundant paths that can exist in a mesh topology network. Some routers have static routing tables that must be manually configured with all network addresses and paths in the internetwork. Other routers are capable of automatically/dynamically creating their own routing tables by listening to network traffic.

The term "Mobile Terminal" and "Mobile Node" are used interchangeably, and refer to a wireless device that can change its point of attachment from one network or sub-network to another. A mobile terminal/node may change its location without losing connectivity and without changing its IP address; it may continue to communicate with other nodes at any location using its (constant) IP address, assuming link-layer connectivity to a point of attachment is available. A mobile node can change its point of attachment from one link to another, while still being reachable via its constant IP address.

Referring to the drawings, like numbers indicate like parts throughout the views. Additionally, a reference to the singular includes a reference to the plural unless otherwise stated or is inconsistent with the disclosure herein.

The invention provides a mechanism for describing a new available route behind a mobile terminal for a packet switched cellular network. IP-level forwarding through a gateway node is possible to and from a new route, which may be a new host-based route to a second address, or a network route to a prefix on a link "behind" the Mobile Terminal, e.g. in another interface on the Mobile Terminal. The destination of the route can be in the Mobile Terminal or behind it in another node, or it can be a subnetwork route pointing behind the Mobile Terminal. Solving this problem enables considering the link between a gateway node and the Mobile Terminal as any IP-enabled point-to-point link between two IP-level routers. In the past, it was difficult to have more than one address in a session profile, e.g., a Packet Data Protocol (PDP) context, that was not originally designed for the Mobile Terminal to operate as a router.

The invention enables sub-networks operating behind a Mobile Terminal. This feature makes the link layer look like a traditional link-layer under IP. Also, it is a prerequisite for calling the IP connectivity generic and not a subset of full IP connectivity. Connecting sub-networks behind the Mobile Terminal makes wireless access technology substantially similar to other IP technologies such as Digital Subscriber Lines (DSL), Integrated Services Digital Network (ISDN), or Local Area Network (LAN), from what IP connectivity features can be supported. Also, the invention supports the legal interception of traffic by the Mobile Terminal and makes a Mobile Terminal operating as a router responsible for the packet traffic forwarded through it.

Additionally, the invention enables heterogeneous devices behind the Mobile Terminal to access the network without them having to have the same link layer as the Mobile Terminal. This feature can be seen as an advantage for the end user and less so when business models wish to end user operations. Although the examples below mostly describe the operation of the invention in a GPRS environment, it is understood that the invention can be employed with any packet switched cellular network.

Illustrative Operating Environment

With reference to FIG. 1, an exemplary mobile IP network in which the invention may operate is illustrated. As shown in the figure, mobile IP network 100 includes mobile terminal (MT) 105, radio access network (RAN) 110, SGSN 115, core network 120, base stations $123_{A\text{-}C}$, routers $125_{A\text{-}C}$, optional bandwidth broker (BB) 300, GGSNs $135_{A\text{-}B}$, data network 140, and data network 145.

The connections and operation for mobile IP network 100 will now be described. Mobile terminal 105 is coupled to radio access network (RAN) 110. Generally, mobile terminal 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. Mobile terminal 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Mobile Terminal 105 manages access and routes message to sub-network 102, which includes several wireless devices $104_{A\text{-}D}$ that are in communication with each other and the mobile terminal. In one embodiment, the sub-network may employ the Bluetooth wireless protocol.

Radio Access Network (RAN) 110 manages the radio resources and provides the user with a mechanism to access core network 120. Radio access network 110 transports information to and from devices capable of wireless communication, such as mobile terminal 105. Radio access network 110 may include both wireless and wired telecommunication components. For example, radio access network 110 may include a cellular tower and/or base stations that are linked to a wired telecommunication network. Typically, the cellular tower carries wireless communication to and from cell phones, pagers, and other wireless devices, and the wired telecommunication network carries communication to regular phones, long-distance communication links, and the like. As shown in the figure, RAN 110 includes base stations 123$_{A-C}$.

According to one embodiment of the invention, routers 125$_{A-C}$ may calculate their own link loads as well as process link loads relating to other nodes on the network. The routers may send a warning message to other routers within the network when its link load exceeds a configurable threshold. When there is at least one link load within each available path from a source to a destination for a new flow that is above the configurable threshold, the new flow attempting to enter the network is rejected.

In yet another embodiment, one or more of base stations 123$_{A-C}$ may have router functionality. Although not shown, Radio Network Controllers (RNCs) may also include router functionality.

Some nodes may be General Packet Radio Service (GPRS) nodes. For example, Serving GPRS Support Node (SGSN) 115 may send and receive data from mobile stations, such as mobile terminal 105, over RAN 110. SGSN 115 also maintains location information relating to MS 105. SGSN 115 communicates between mobile terminal 105 and Gateway GPRS Support Node (GGSN)s 135$_{A-B}$ through core network 120. According to one embodiment of the invention, BB 300 communicates with RAN 110 and core network 120.

Core network 120 is an IP packet based backbone network that includes routers, such as routers 125$_{D-F}$, to connect the support nodes in the network. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units.

GGSNs 135$_{A-B}$ are coupled to core network 120 through routers 125$_{A-C}$ and act as wireless gateways to data networks, such as network 140 and network 145. Networks 140 and 145 may be the public Internet or a private data network. GGSNs 135$_{A-B}$ allow mobile terminal 105 to access network 140 and network 145.

The operator may set threshold levels to determine whether or not to accept a new flow based on different service classes for a particular user or group of users. As mentioned above, the routers, or some other dedicated network element may be used for this purpose. For example, conversational traffic from user group A may be carried with an Expedited Forwarding (EF) class would have one threshold level, whereas conversational traffic from user group B carried with an Assured Forwarding (AF) class would have a different service level. A user of mobile terminal 105 may be differentiated into one of these user groups by the user Mobile Station Integrated Services Digital Network (MSISDN) number that is known to both the SGSN and the GGSN support nodes.

Furthermore, computers, and other related electronic devices may be connected to network 140 and network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
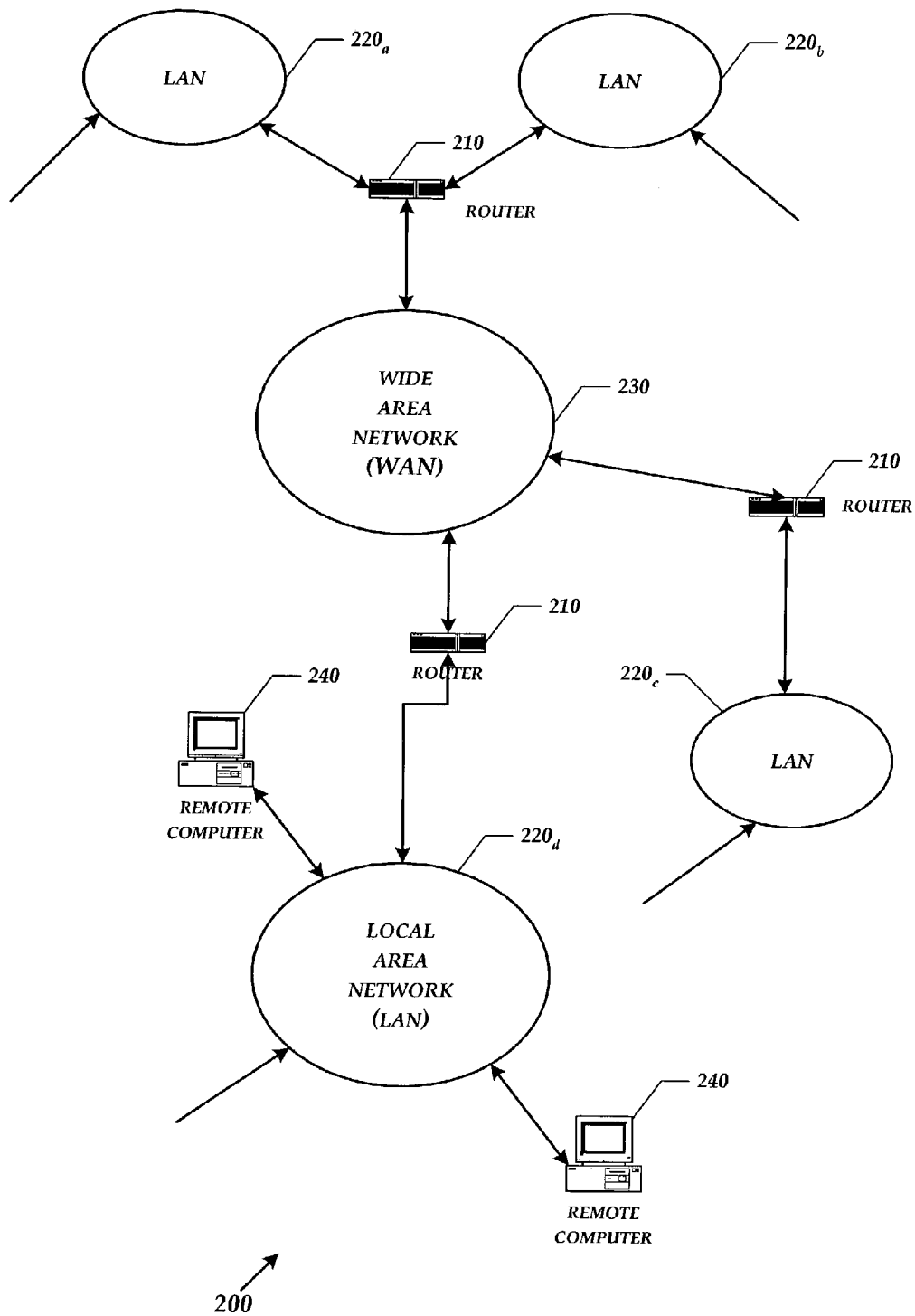
FIG. 2 shows a schematic diagram that illustrates an exemplary system overview in which local area networks and a wide area network are interconnected by routers.

FIG. 2 shows another exemplary system in which the invention operates in which a number of local area networks ("LANs") 220$_{a-d}$ and wide area network ("WAN") 230 interconnected by routers 210. On an interconnected set of LANs—including those based on differing architectures and protocols—, a router acts as a link between LANs, enabling messages to be sent from one to another.

Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links.

Furthermore, computers, such as remote computer 240, and other related electronic devices can be remotely connected to either LANs 220$_{a-d}$ or WAN 230 via a modem and temporary telephone link. The number of WANs, LANs, and routers in FIG. 2 may be increased or decreased without departing from the spirit or scope of this invention. As such, the Internet itself may be formed from a vast number of such interconnected networks, computers, and routers and that an embodiment of the invention could be practiced over the Internet without departing from the spirit and scope of the invention.

Illustrative Methods

In a packet switched cellular network, this invention enables a serving node to be aware of a new node or subnetwork that has become active behind a Mobile Terminal that acts as a router, when IP-level route injection occurs at the Mobile Terminal.

In an exemplary GPRS network, as a result of an IP route or IP address injection into a Mobile Terminal, a signaling message is provided from the Mobile Terminal with a request for modifying the PDP Context which causes insertion of a new address or prefix to a GGSN when it learns of routes that have been inserted into the Mobile Terminal and where the destinations are on the Mobile Terminal side. After learning of a new route, the GGSN checks whether the requested address is in its pool of addresses and prefixes, and then updates the new route to the serving node, i.e., the SGSN. Also, for optional optimization, at the IP layer, a corresponding IP route may also get injected to the GGSN after it gets injected to the Mobile Terminal.

Learning of a route can be classified into two categories, dynamic and static. A Mobile Terminal and a gateway node such as a GGSN can share routing information over a dynamic routing protocol. Also, the Mobile Terminal and the GGSN can configure static routing information on routes towards each other. In one embodiment, a route can be added with 24.008 and GTP messages, when initiated on the Mobile Terminal side. It also applies to both static and dynamic route addition.

To exchange data packets with an external packet data network after successful attachment to a GPRS network, a Mobile Terminal applies for one or more addresses used in an external packet data network, e.g., an IP address. This address is called a PDP address (Packet Data Protocol address). Also, a PDP context can be understood as a profile that describes characteristics of each session. The PDP context can contain the PDP type (e.g., IPv4, IPv6, etc.), the PDP address assigned to the mobile terminal (e.g., 129.187.222.10), the requested quality of service, and the address of a GGSN that serves as the access point to the external packet data network. This PDP context is typically stored in the Mobile Terminal, the SGSN, and the GGSN. With an active PDP context, the Mobile Terminal becomes "visible" to an external packet data network and is able to send and receive data packets. The mapping between the PDP address and an international mobile subscriber identity (IMSI), enables the GGSN to transfer data packets between the external packet data network and a Mobile Terminal. In certain circumstances, a user may have several simultaneous PDP contexts active at a given time.

Additionally, besides phone numbers and subscriber and equipment identifiers, other identifiers are employed for the management of subscriber mobility and for addressing other network elements. In particular, the international mobile station equipment identity (IMEI) uniquely identifies a mobile terminal internationally. It operates as kind of a serial number. The IMEI is allocated by an equipment manufacturer and registered by the network operator. Also, each registered user is uniquely identified by their international mobile subscriber identity (IMSI), which is stored in a subscriber identity module (SIM) card. For operating on a GPRS network, a Mobile Terminal typically requires a SIM with a valid IMSI to be inserted into equipment with a valid IMEI.

Figure 3:
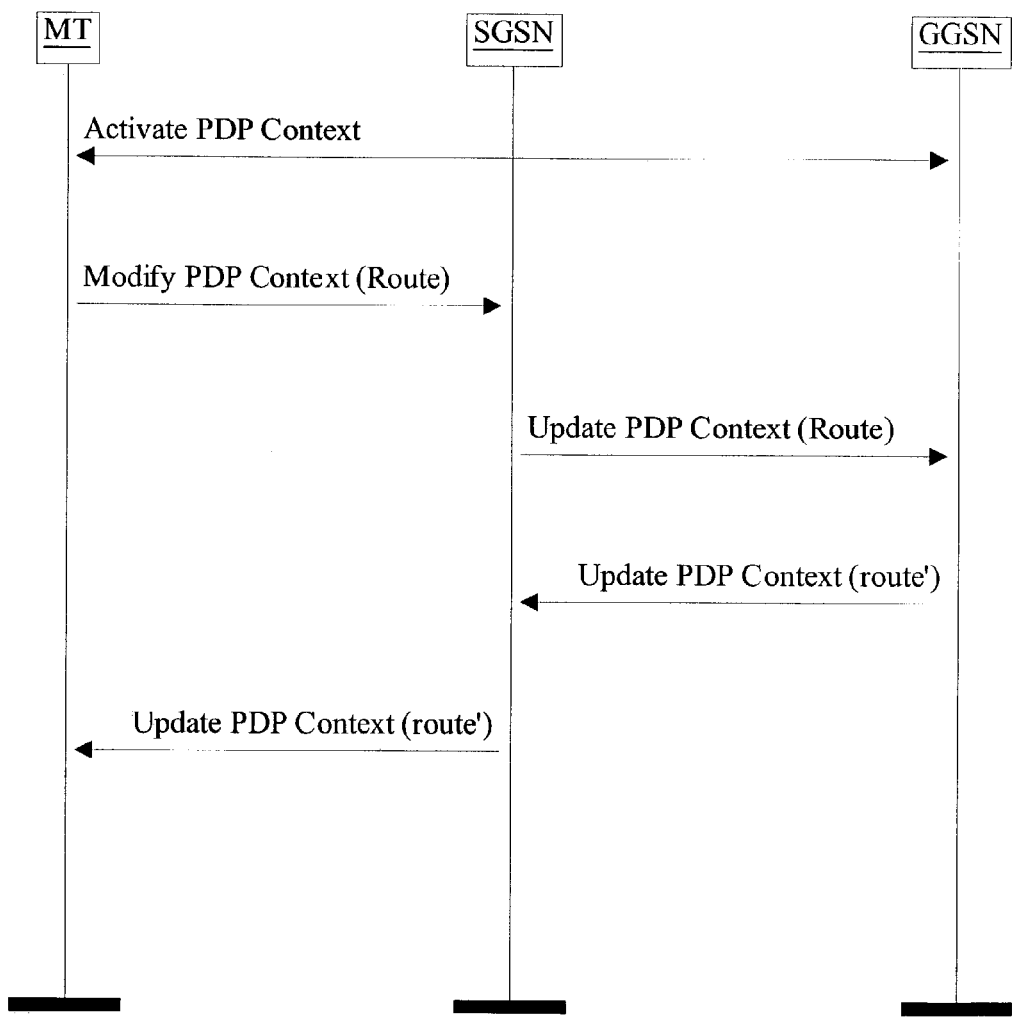
FIG. 3 illustrates a schematic diagram of signals between a Mobile Terminal, GGSN and SGSN in accordance with the invention.

In FIG. 3, the case of static route addition in the Mobile Terminal is illustrated for an exemplary GPRS network. A presumption is that the Mobile Terminal first has established its presence before IP routing information is manipulated. The message flow in the drawing is as follows:

1. The Mobile Terminal activates a PDP Context
2. The Mobile Terminal wishes to add a new route and thus, sends a request for modifying the PDP Context with the proposed route.
3. The SGSN records the proposed route for itself, and updates the GGSN with the request for modifying the PDP Context with the proposed route.
4. The GGSN checks if it is possible to add the proposed route, if it is GGSN updates its routing table, and responds with an updated PDP Context response and the same route. If it is not, either an error message is responded, or an updated proposed route is returned.
5. SGSN updates its routing information accordingly.
6. The Mobile Terminal checks the response and updates its routing table accordingly The invention is that the signaling as described above can be used for route addition. The same messages can be used to delete a route as well. However, the main idea is that a new route can be inserted to the Mobile Terminal so that the GGSN and other elements are properly signaled by means of the GTP.

IP-level static route addition in the Mobile Terminal as well as dynamic route addition is enabled by a routing daemon in the Mobile Terminal that results in the presented signaling. Both of these cases converge into kernel forwarding entry injection in the Mobile Terminal, which employs the signaling messages described for FIG. 3.

This implementation contains an API from the IP routing engine of the Mobile Terminal to the GPRS signaling, where the manipulation of kernel routes or alias addresses through the usual IP routing socket API results in the triggering of corresponding PDP context modification signals.

In one embodiment, the invention could be implemented by adding information to an activate PDP Context message [24.008] and adding a GTP extension to GTP [29.060]. This would then allow the insertion and deletion for a route without opening PDP Contexts. Also, the operation of the invention may be detected by a protocol analyzer coupled to a network.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for adding a new route for a node disposed behind a mobile terminal, wherein the mobile terminal is operable as a router for the node disposed behind the mobile terminal, comprising:
    (a) in response to receiving the new route for the node disposed behind the mobile terminal, employing the mobile terminal to send an Activate session profile message to a gateway node and sending a Modify session profile message along with the new route to a serving node;
    (b) enabling the serving node to record the new route and update the gateway node with the new route;
    (c) employing the gateway node to determine each new route that is updateable to a routing table, wherein each updateable new route is added to the routing table and an Update session profile message along with the new route is sent to the serving node and the mobile terminal; and
    (d) employing the gateway node to determine each new route that is un-updateable to the routing table, wherein if the gateway node is unable to propose another new route that is updateable to the routing table for the node disposed behind the mobile terminal, employing the gateway node to send an error message to the serving node and the mobile terminal, and wherein if the gateway node does propose the other new route that is updateable to the routing table for the node disposed behind the mobile terminal, employing the gateway node to send the other new route along with the Update session profile message to the serving node where they are employed to update the serving node and the mobile terminal with the other new route.

2. The method of claim 1, wherein the node represents at least one subnetwork.

3. The method of claim 1, further comprising:
    (a) in response to receiving a request to delete a route for the node disposed behind the mobile terminal, employing the mobile terminal to send another Activate session profile message to the gateway node and sending another Modify session profile message along with the deleted route to the serving node;
    (b) enabling the serving node to record the deletion of the route and update the gateway node with the deletion of the route;

(c) enabling the gateway node to delete the route from the routing table and send another Update session profile message along with the deleted route to the serving node; and (d) enabling the serving node to send yet another Update session profile message along with the deleted route to the mobile terminal.

4. The method of claim 1, wherein the serving node is an SGSN, and the gateway node is a GGSN, and the session profile is a PDP context.

5. The method of claim 1, further comprising enabling GPRS signaling for an API for an IP routing engine of the mobile terminal, wherein manipulation of at least one of a kernel route and an alias address through an IP routing socket causes the triggering of a corresponding Modify PDP context message.

6. The method of claim 1, further comprising enabling the mobile terminal and the gateway node to share routing information over a dynamic routing protocol.

7. The method of claim 1, further comprising enabling the mobile terminal and the gateway node to configure static routing information on at least one route towards each other.

8. A system for adding a new route for a node disposed behind a mobile terminal, wherein the mobile terminal is operable as a router for the node disposed behind the mobile terminal, comprising:

(a) if the mobile terminal does add the new route for the node disposed behind the mobile terminal, an Activate session profile message is sent by the mobile terminal to a gateway node and the mobile terminal sends a Modify session profile message with the new route to a serving node;

(b) in response to receiving the Modify session profile message, the serving node a provides an Update session profile message along with the new route to the gateway node; and (c) in response to receiving the Update session profile message, the gateway node checks the validity of adding the new route, and if true, the gateway node updates its routing table and sends another Update session profile message to the serving node along with the new route, and if false, at least one of an error message and a proposed route is provided to the mobile terminal and the serving node, wherein the serving node and the mobile terminal update their respective routing information with the proposed route.

9. The system of claim 8, wherein the node represents at least one sub-network.

10. The system of claim 8, further comprising enabling an API from an IP routing engine of the mobile terminal for GPRS signaling, wherein manipulation of at least one of a kernel route and an alias address through an IP routing socket causes the triggering of a corresponding Modify PDP context message.

11. The system of claim 8, further comprising enabling the mobile terminal and the gateway node to share routing information over a dynamic routing protocol.

12. The system of claim 8, further comprising enabling the mobile terminal and the gateway node to configure static routing information on at least one route towards each other.

13. The system of claim 8, wherein the gateway node is a GGSN, the serving node is a SGSN and the session profile is a PDP context.

14. A mobile terminal that enables a new route to be added for a node disposed behind the mobile terminal, wherein the mobile terminal is operable as a router for the node disposed behind the mobile terminal, comprising:

(a) a transceiver for communicating messages;

(b) a memory of storing instructions; and (c) a processor for performing actions, including:

(i) in response to receiving the new route for the node disposed behind the mobile terminal, employing the mobile terminal to send an Activate session profile message to a gateway node and sending a Modify session profile message along with the new route to a serving node;

(ii) enabling the serving node to record the new route and update the gateway node with the new route;

(iii) enabling the gateway node to determine each new route that is updateable to a routing table, wherein each updateable new route is added to the routing table and an Update session profile message along with the new route is sent to the serving node and the mobile terminal; and (iv) enabling the gateway node to determine each new route that is un-updateable to the routing table, wherein if the gateway node is unable to propose another new route that is updateable to the routing table for the node disposed behind the mobile terminal, employing the gateway node to send an error message to the serving node and the mobile terminal, and wherein if the gateway node does propose the other new route that is updateable to the routing table for the node disposed behind the mobile terminal, employing the gateway node to send the other new route along with the Update session profile message to the serving node where they are employed to update the serving node and the mobile terminal with the other new route.

15. The mobile terminal of claim 14, wherein the node represents at least one sub-network.

16. The mobile terminal of claim 14, further comprising:

(a) in response to receiving a request to delete a route for the node disposed behind the mobile terminal, employing the mobile terminal to send another Activate session profile message to the gateway node and send another Modify session profile message along with the deleted route to the serving node;

(b) enabling the serving node to record the deletion of the route and update the gateway node with the deletion of the route;

(c) enabling the gateway node to delete the route from the routing table and send another Update session profile message along with the deleted route to the serving node; and (d) enabling the serving node to send yet another Update session profile message along with the deleted route to the mobile terminal.

17. The mobile terminal of claim 14, wherein the gateway node is a GGSN, the serving node is a SGSN, and the session profile is a PDP context.

18. The mobile terminal of claim 14, further comprising enabling GPRS signaling for an API for an IP routing engine of the mobile terminal, wherein manipulation of at least one of a kernel route and an alias address through an IP routing socket causes the triggering of a corresponding PDP context modification message.

19. The mobile terminal of claim 14, further comprising enabling the mobile terminal and the gateway node to share routing information over a dynamic routing protocol.

20. The mobile terminal of claim 14, further comprising enabling the mobile terminal and the gateway node to configure static routing information on at least one route towards each other.

21. A serving node that enables a new route to be added for a node disposed behind a mobile terminal, wherein the mobile terminal is operable as a router for the node disposed behind the mobile terminal, comprising:
- (a) a transceiver for communicating messages;
- (b) a memory of storing instructions; and
- (c) a processor for performing actions, including:
  - (i) in response to receiving a Modify session profile message along with the new route from a mobile terminal, enabling the mobile terminal to send an Activate session profile message to a gateway node;
  - (ii) recording the new route at the serving node and sending an Update session profile message to the gateway node along with the new route;
  - (iii) enabling the gateway node to determine each new route that is updateable to a routing table, wherein each updateable new route is added to the routing table and another Update session profile message along with the new route is sent to the serving node and the mobile terminal; and
  - (iv) enabling the gateway node to determine each new route that is un-updateable to the routing table, wherein if the gateway node is unable to propose another new route that is updateable to the routing table for the node disposed behind the mobile terminal, employing the gateway node to send an error message to the serving node and the mobile terminal, and wherein if the gateway node does propose the other new route that is updateable to the routing table for the node disposed behind the mobile terminal, employing the gateway node to send the other new route along with the other Update session profile message to the serving node where they are employed to update the serving node and the mobile terminal with the other new route.

22. The serving node of claim 21, wherein the gateway node is a GGSN, the serving node is a SGSN, and the session profile is a PDP context.

23. The serving node of claim 21, wherein the node represents at least one sub-network.

24. The serving node of claim 21, further comprising:
- (a) in response to receiving another Modify session profile message along with a deleted route from the mobile terminal, enabling the mobile terminal to send another Activate session profile message to the gateway node;
- (b) employing the serving node to record the deletion of the route and update the gateway node with the deletion of the route;
- (c) enabling the gateway node to delete the route from the routing table and provide yet another Update session profile message to the serving node along with the deleted route; and
- (d) employing the serving node to send still another Update session profile message along with the deleted route to the mobile terminal.

25. The serving node of claim 21, further comprising enabling GPRS signaling for an API for an IP routing engine of the mobile terminal, wherein manipulation of at least one of a kernel route and an alias address through an IP routing socket causes the triggering of a corresponding PDP context modification message.

26. The serving node of claim 21, further comprising enabling the mobile terminal and the gateway node to share routing information over a dynamic routing protocol.

27. The serving node of claim 21, further comprising enabling the mobile terminal and the gateway node to configure static routing information on at least one route towards each other.

28. A gateway node that enables a new route to be added for a node disposed behind a mobile terminal, wherein the mobile terminal is operable as a router for the node disposed behind the mobile terminal, comprising:
- (a) a transceiver for communicating messages;
- (b) a memory of storing instructions; and
- (c) a processor for performing actions, including:
  - (i) in response to receiving an Activate session profile message from a mobile terminal, enabling a serving node to receive a Modify session profile message along with the new route from the mobile terminal;
  - (ii) enabling the serving node to record the new route and send an Update session profile message to the gateway node with the new route;
  - (iii) employing the gateway node to determine each new route that is updateable to a routing table, wherein each updateable new route is added to the routing table and another Update session profile message along with the new route is sent to the serving node and the mobile terminal; and
  - (iv) employing the gateway node to determine each new route that is un-updateable to the routing table, wherein if the gateway node is unable to propose another new route that is updateable to the routing table for the node disposed behind the mobile terminal, employing the gateway node to send an error message to the serving node and the mobile terminal, and wherein if the gateway node does propose the other new route that is updateable to the routing table for the node disposed behind the mobile terminal, employing the gateway node to send the other new route along with the other Update session profile message to the serving node where they are employed to update the serving node and the mobile terminal with the other new route.

29. The gateway node of claim 28, wherein the gateway node is a GGSN, the serving node is a SGSN, and the session profile is a PDP context.

30. The gateway node of claim 28, wherein the node represents at least one sub-network.

31. The gateway node of claim 28, further comprising:
- (a) in response to receiving another Activate session profile from the mobile terminal, enabling the serving node to receive another Modify session profile message along with a deleted route from the mobile terminal;
- (b) enabling the serving node to record the deletion of the route and update the gateway node with the deletion of the route;
- (c) employing the gateway node to delete the route from the routing table and provide yet another Update session profile message to the serving node along with the deleted route; and
- (d) enabling the serving node to send still another Update session profile message along with the deleted route to the mobile terminal.

32. The gateway node of claim 28, further comprising enabling GPRS signaling for an API for an IP routing engine of the mobile terminal, wherein manipulation of at least one of a kernel route and an alias address through an IP routing socket causes the triggering of a corresponding PDP context modification message.

33. The gateway node of claim 28, further comprising enabling the mobile terminal and the gateway node to share routing information over a dynamic routing protocol.

34. The gateway node of claim 28, further comprising enabling the mobile terminal and the gateway node to configure static routing information on at least one route towards each other.

* * * * *